United States Patent

Otruba

[11] Patent Number: 6,165,304
[45] Date of Patent: Dec. 26, 2000

[54] METHOD OF MAKING READILY REMOVABLE LABELS

[75] Inventor: Svatoboi Otruba, Ceres, Calif.

[73] Assignee: B & H Manufacturing Company, Inc., Ceres, Calif.

[21] Appl. No.: 09/044,218

[22] Filed: Mar. 18, 1998

Related U.S. Application Data

[62] Division of application No. 08/709,990, Sep. 9, 1996, abandoned.

[51] Int. Cl.$^7$ .............................. B65C 3/08; B23K 26/06; B26D 9/00
[52] U.S. Cl. ........................ 156/252; 156/256; 156/270; 156/272.8; 156/275.7; 156/344; 156/513; 156/244.18; 283/70; 493/370
[58] Field of Search ..................................... 156/252, 256, 156/269, 270, 272.8, 275.7, 344, 513, 521, 446, 566, 570, 324, 244.18; 283/70, 81; 83/13; 493/370; 40/638

[56] References Cited

U.S. PATENT DOCUMENTS

| | | | |
|---|---|---|---|
| 3,702,511 | 11/1972 | Miller | 40/306 |
| 4,042,739 | 8/1977 | Emal et al. | 428/137 |
| 4,094,324 | 6/1978 | Bolsinger et al. | 131/336 |
| 4,108,709 | 8/1978 | Hoffmann | 156/446 |
| 4,118,619 | 10/1978 | McArthur et al. | 219/121.7 |
| 4,181,555 | 1/1980 | Hoffmann | 156/265 |
| 4,207,458 | 6/1980 | Lilly, Jr. et al. | 219/384 |
| 4,236,062 | 11/1980 | Lilly, Jr. et al. | 219/384 |
| 4,370,942 | 2/1983 | Dowding et al. | 118/40 |
| 4,411,280 | 10/1983 | Floyd et al. | 131/332 |
| 4,500,386 | 2/1985 | Hoffmann | 156/449 |
| 4,947,853 | 8/1990 | Hon | 600/459 |
| 4,978,416 | 12/1990 | Potter et al. | 156/571 |
| 5,057,347 | 10/1991 | Alvin | 428/43 |
| 5,102,715 | 4/1992 | Zetterquist | 428/137 |
| 5,246,775 | 9/1993 | Loscuito | 428/343 |
| 5,269,864 | 12/1993 | Otruba | 156/215 |
| 5,587,096 | 12/1996 | Huvard et al. | 219/521 |

FOREIGN PATENT DOCUMENTS 2640109  3/1978  Germany.

Primary Examiner—Linda L. Gray
Attorney, Agent, or Firm—LaRiviere, Grubman & Payne, LLP

[57] ABSTRACT

A method is provided for applying segments of sheet material to articles by adhering leading and trailing ends of the label segments to the articles. The method further includes forming a plurality of perforations in the label segments in the vicinity of the ends as the segments are formed. The perforations allow access to solvent to dissolve or loosen the adhesive and facilitate subsequent removal of the label. The perforations can be formed in a spaced relation along a length of a web of sheet material. The web of sheet material is then cut into sheets along a line the locates the perforations at the trailing end of one segment and the leading end of another segment.

4 Claims, 2 Drawing Sheets

FIG.—1

METHOD OF MAKING READILY REMOVABLE LABELS

This is a divisional application of Ser. No. 08/709,990 filed Sep. 9, 1996, now abandoned.

BACKGROUND OF THE INVENTION

This invention relates to the labeling of containers by a method, and by using labels, which enable the labels to be readily removed from the container when the contents of the container have been consumed.

It is desirable to remove labels from containers after the containers' content has been consumed. The containers themselves may be recycled or the material of which the containers are constructed may be recycled for producing new containers or other articles.

Where the labels are paper labels and they are adhered to the container by a water soluble glue, removal of the labels is relatively easy. Thus they can be introduced into washing apparatus, washing with water, warmed if necessary and containing a surfactant if necessary or desirable. This will penetrate the paper and will dissolve the glue and thus enable the label to be removed easily.

However where the labels are of plastic material which is not water soluble and is not readily penetrated, and/or where the adhesive used to adhere the label to a container is not water soluble, this procedure is much less effective.

OBJECTS OF THE INVENTION

It is an object of the present invention to provide labels which can be readily removed from containers to which they have been applied.

It is a particular object of the invention to provide labels and labeled containers which provide ready access of a solvent to the adhesive used to adhere the label to the container.

The above and other objects will be apparent from the ensuing description and the ensuing claims.

SUMMARY OF THE INVENTION

In accordance with the invention of a label is perforated to provide a large number of very small perforations. These perforations allow access of water or other liquid to the underlying surface or surfaces, including glue between the trailing end and leading end of the label where the trailing end is lapped over the leading end and to adhesive between the leading end of the label and the container. For example, where a label is wrapped completely around a container and its trailing end is lapped over and adhered to the leading end by means of adhesive, the leading end being adhered to the container by adhesive, this multiplicity of small perforations will overlie this overlap area and will permit access of a solvent to the adhesive between the trailing and leading ends and between the leading end and the container. Where the label is not wrapped completely around the container, and both its leading and trailing ends are adhered directly to the container by adhesive, the pattern of perforations will be applied to both the leading end and the trailing end as in the case of a complete wrap with an overlap of the leading end by the trailing end.

By this means when it is desired to de-label the container, a suitable solvent is applied, e.g., by a spray of water or other solvent or by immersing the label container in a body of solvent. The solvent may be warmed or heated to accelerate its action and it may contain a surfactant to aid in absorption of the adhesive.

If the adhesive is not water soluble a suitable solvent may be used.

DETAILED DESCRIPTION OF THE PREFERRED EMBODIMENTS

Figure 1:
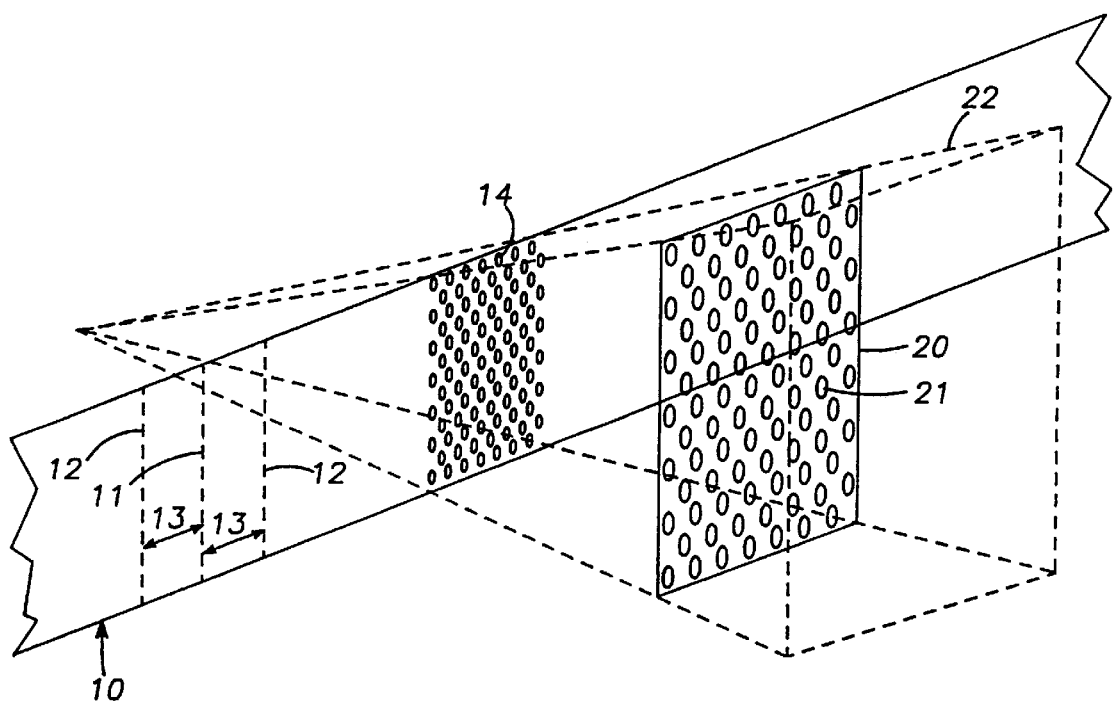
FIG. 1 is a diagrammatic view of showing one method of perforating labels.

Referring to FIG. 1, a continuous strip or web 10 of label material is shown such as might be withdrawn from a roll of label material. As is well known, for example as shown in U.S. Pat. No. 4,500,386, such a web is fed continuously from a roll to a label cutter which severs labels of desired length. The labels are deposited on a rotating vacuum drum and rotated to a label applying station. During transit from the station where labels are picked up by the vacuum drum and the label applying station, glue will be applied to the leading and trailing ends of the label. At the label applying station containers are supplied in sequence, the leading end of each label is adhered to a container, being released from the vacuum drum, and the container with the label commencing to wrap around it is rotated to completely wrap the label around it, or partially wrap it in case it is not desired to have a full wrap level. Representative patents describing such procedure are U.S. Pat. Nos. 4,108,709; 4,181,555 and 5,269,864.

Perforation methods described herein may be carried out separately from the cutting and label applying operation or they may be carried out on the web of label material as it is supplied to a labeling machine. Also the labeling need not be of the continuous, so-called roll fed type but may be carried out with a stack of labels which have been previously severed from a web of label material and which have been perforated.

Referring again to FIG. 1 a broken line 11 is shown which indicates a line along which the label stock will be severed into individual label lengths by the aforementioned cutter. Or as described above the label material may be severed into individual labels which are accumulated in a stack and fed from the stack to a labeling machine.

On either side of line 11 is another broken line 12. The space or zone between the line 11 and each of the lines 12 is indicated by reference numeral 13. Assuming that a continuous roll of fed labeling operation is employed, the line 11 marks the trailing end of one label and the leading end of the next label.

In accordance with the present invention a pattern of a multiplicity of perforations 14 is formed in the web in the areas 13 on either side of each line 11.

The perforations 14 are closely spaced and each is very small, being about the dimensions of a pin hole. The pattern may be a geometric pattern with the perforations in columns, uniformly spaced apart and with the columns themselves spaced uniformly apart. However this is not necessary. The pattern may be a random pattern provided there are many perforations, each small in diameter and sufficient in number that a solvent will have access to the adhesive layer or layers between the overlapped ends of the label (if such type of labeling is employed) and to the adhesive adhering the end or ends of the label directly to the container.

The perforations 14 may be formed in any one of several ways. For example, as shown in FIG. 1 they may be burned into the web material by a laser beam. As shown in FIG. 1 a mask 20 provided with a pattern of perforations 21 is interposed between a laser beam 22 and the web 10. The mask screens out all of the laser radiation except that which passes through the pattern of holes 21. The size of these holes and the geometry of the configuration are such that the beam passing through the mask will strike the web 10 at the desired position along zones 13 on either side of the line 11 separating one label from the next. If this is carried out while the label is being transported from a roll to a cutter and thence to a vacuum drum, the mask may be held stationary and the laser beam turned on and off as the web moves so that it will burn perforations 14 in and only in the zones 13. Alternatively the web 10 may be subjected to laser radiation separately from the labeling operation and then rewound into a roll and supplied to a labeling machine as needed. It will also be understood that a web so treated by laser radiation may be severed into individual labels which are then supplied to a stack fed labeling machine such as that shown in U.S. Pat. No. 4,978,416. The procedure described above with reference to FIG. 1 is a procedure such as employed by cigarette manufacturers to burn holes in the paper which surrounds the filter of the cigarettes, the purpose of which is to draw air into the stream of smoke as it is being inhaled. The air thus drawn into the filter burns part of the smoke and reduces the tar content of the smoke that is inhaled.

Another way of perforating label material is to incorporate water vapor into plastic material just before it is extruded. Then the plastic material is extruded and the water vapor will burst through the plastic material before the latter has completely solidified, and in doing so it will form perforations.

Yet another way to accomplish the pattern of perforations is to apply a roller to the label material, the roller being equipped with a multitude of small needles projecting from its cylindrical surface. The roller and needles may be heated to facilitate penetration and caused burning of the material of the web surrounding each perforation.

Figure 2:
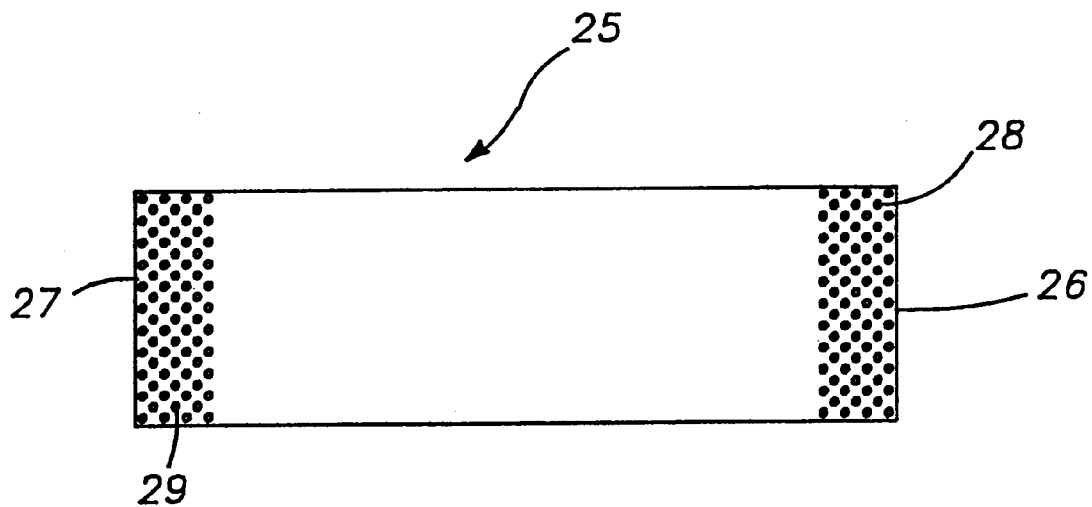
FIG. 2 is a view of a label perforated in accordance with the invention.

Referring now to FIG. 2 an individual label is shown and is identified by reference numeral 25. It has a leading end 26 and a trailing end 27. It is formed adjacent the leading end with a pattern of perforations 28. At its trailing end it is similarly formed with a pattern of perforations 29.

Figure 3:
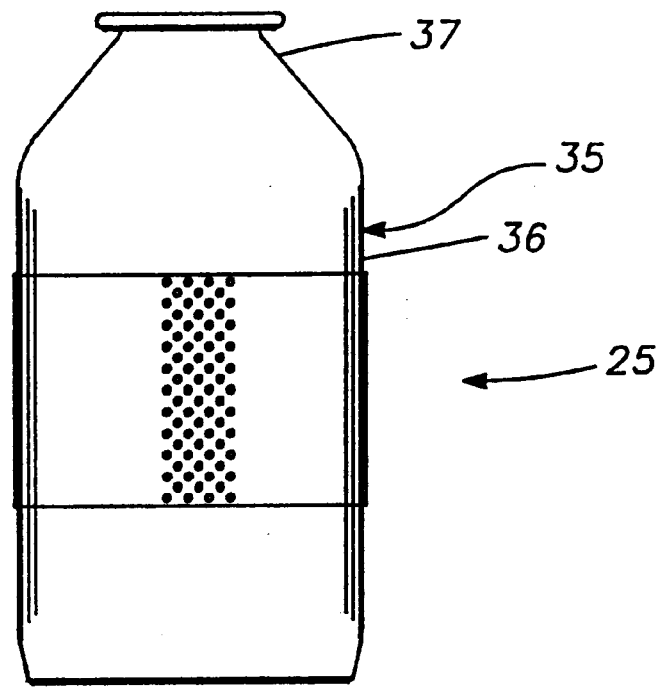
FIG. 3 is a view of a container labeled in accordance with the invention.

Referring now to FIG. 3 a container is shown identified by the reference numeral 35 and comprising a body portion 36 and a neck 37. A label 25 is shown applied to the container with the pattern of perforations 29 overlying the pattern of perforations 28.

When the contents of the container have been consumed it will then be subjected to contact with a suitable solvent. In cases where the adhesive use is a water soluble glue, this may be water, heated if necessary and to which a surfactant may be added if desired. The water will penetrate the perforations and will dissolve the adhesive, thus enabling ready removal of the label, as by gentle abrasion. If the adhesive is not water soluble then a suitable solvent may be provided, for example, acetone, xylene or a chlorinated hydrocarbon.

The procedure described above may be applied to paper labels and metal foil as well as plastic labels, but it is more useful in connection with plastic labels, because the latter are not as amenable as paper to removal with water. Representative label materials, adhesive materials and adhesive solvents are set forth in Table 1 below.

TABLE 1

| Label material | Available adhesive | Adhesive solvent |
| --- | --- | --- |
| paper | casein and rosin | higher pH water (pH > 7.0) |
|  | casein solution with borophosphate | higher pH water (pH > 7.0) |
|  | jelly gum dextrin | cold water |
| cellophane | water-alcohol casein solution | alcohol |
|  | casein solution with alkaline salts | alcohol-water solution |
|  | nitrocelluose heat-seal | toluene |
| aluminum foil | alkaline starch | water |
| polyethylene | jelly gum dextrin | cold water |
|  | pressure sensitive rubber-based | acetone, toluene, hexane naphta, gasoline |
|  | silicone resin | xylene |
| high density polyethylene | ethylene vinyl acetate hot melt | acetone, toluene |
| polypropylene, polystyrene | celluosic plastics of celluose | acetone 8:2 toluene/ |
|  | ethyl celluose | ethyl alcohol |
|  | ethylene copolymer hot melt | acetic acid, acetone, |
|  | polyamide hot melt | cyclohexanol, |
|  | ethylene vinyl acetate hot melt | cresilic acid |
|  | ethylene ethyl acrylate hot melt | acrylic acids |
| treated polypropylene | jelly gum dextrin | cold water |

This invention has been described above with respect to labels which are used as segments each having a leading end and trailing end unattached to the leading end, and the label is wrapped around a container. An alternative method of labeling is to employ a label in the form of a sleeve which is then fitted over and shrunk onto the container, either by its elasticity or by application of heat. Normally in such a labeling procedure adhesive is not used, but if adhesive is used, e.g. applied to the container, the sleeve may be perforated as described above, e.g. by the use of laser radiation before being formed into a sleeve.

Also it will be apparent that the invention is useful in the application of segments or sleeves of sheet material other than labels, e.g. protecting sheets, and to articles other than containers.

It will therefore be apparent that a new and useful label, method of labeling and the labeled containers have been provided.

What is claimed is:

1. A method of applying segments of sheet material to articles comprising the steps of:
   forming a plurality of perforations in a leading and trailing end of a segment of sheet material by forming the perforations in spaced relation along a length of a web of sheet material, and cutting the web of segments sheet material into segments along lines that provide the perforations at the trailing end of one segment and the leading end of another segment;
   applying the leading end of the segment to the article and adhering the leading end to the article by adhesive;
   wrapping the segment around the article; and
   adhering the trailing end of the segment to one of the exterior surface of the article or the leading end of the segment by adhesive.

2. The method of claim 1 in which the segment is a label and the article is a container.

3. The method of claim 2 in which the label is plastic.

4. The method of claim 2 in which the label is paper.

* * * * *